April 3, 1951

R. D. EAGLESFIELD ET AL 2,547,695

POWER STEERING CONTROL FOR GARDEN TRACTORS OR THE LIKE

Filed July 19, 1948

INVENTORS.
ROBERT D. EAGLESFIELD,
AUSTIN E. CURTISS and
BY: CHARLES W. MEGGENHOFEN, Harold B. Wood.
ATTORNEY.

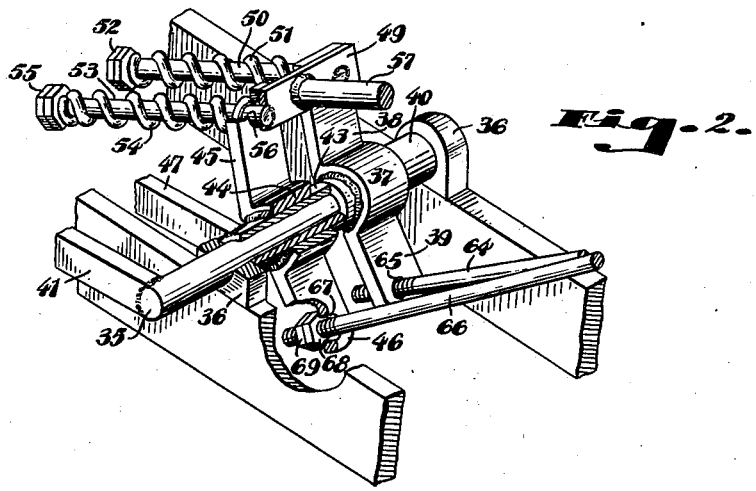
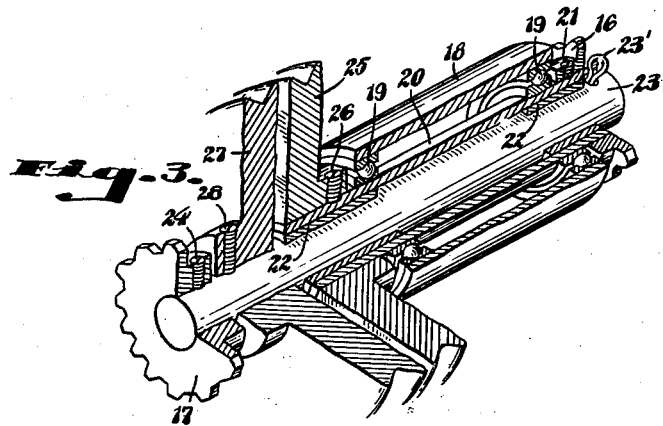
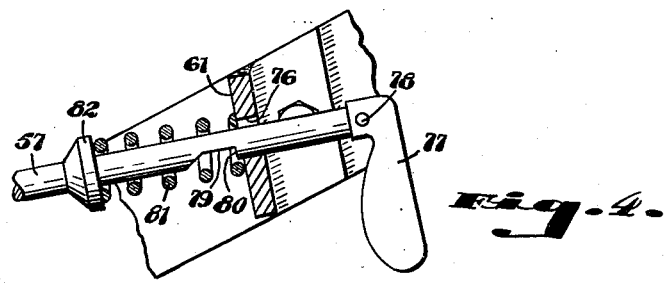

Patented Apr. 3, 1951

2,547,695

UNITED STATES PATENT OFFICE 2,547,695

POWER STEERING CONTROL FOR GARDEN TRACTORS OR THE LIKE

Robert D. Eaglesfield, Austin E. Curtiss, and Charles W. Meggenhofen, Indianapolis, Ind., assignors to R. D. Eaglesfield Corporation, Indianapolis, Ind., a corporation of Indiana Application July 19, 1948, Serial No. 39,534

15 Claims. (Cl. 180—6.2)

The present invention relates to garden and yard machinery, and particularly to the provision of improved steering control for automotive machinery such as garden tractors, lawn mowers, and similar devices. The primary object of the invention is to provide, in a device of the character under consideration, improved means for controlling the driving connections between a prime mover and the ground wheels of an automotive machine, of such character that the driving connections to the respective wheels may be concurrently or independently controlled. Further objects of the invention will appear as the description proceeds.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 2 is an enlarged fragmentary perspective view of certain essential elements of the control, parts being broken away for clarity of illustration;

Fig. 3 is an enlarged perspective view of a jack shaft assembly, parts being shown in section; and Fig. 4 is a fragmentary elevation, upon an enlarged scale, of a modified form of latch means for a master control rod, parts being shown in section.

Figure 1:
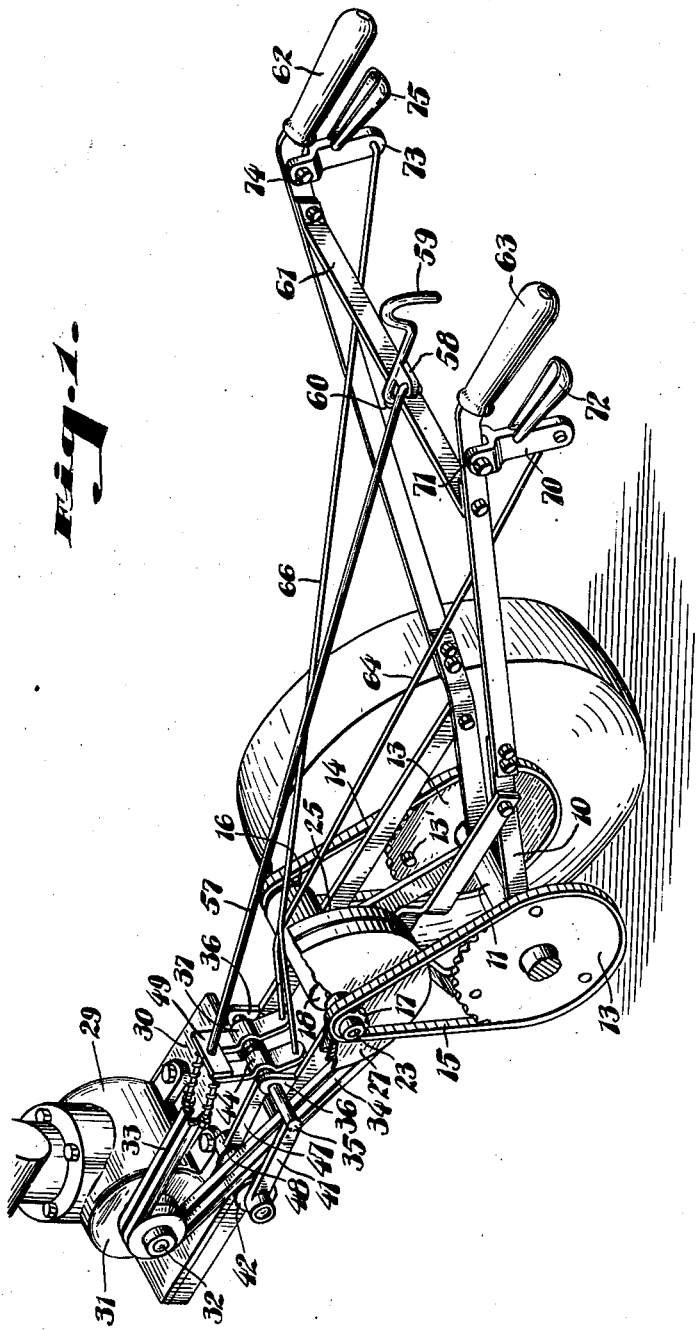
Fig. 1 is a perspective fragmentary view of an embodiment of our invention in a garden tractor.

Referring more particularly to the drawings, it will be seen that we have illustrated a machine comprising a frame 10 mounted upon an axle 11 adapted to be supported by ground wheels 12, only one of which is shown. The axle-wheel assembly is such that the two wheels are independently rotatable about the axis of the axle 11. A driving sprocket 13 is provided for each wheel 12, being operatively connected thereto in any suitable fashion, as by bolts 13'; and the righthand sprocket is adapted to be driven by a chain 14 while the lefthand sprocket is adapted to be driven by a chain 15. The chains 14 and 15, respectively, mesh with sprockets 16 and 17 incorporated in a jack shaft assembly now to be described.

A barrel 18 is suitably supported upon the frame 10 and receives, adjacent its opposite ends, anti-friction bearings 19, 19, ball bearing being shown.

A sleeve 20 is journalled in the bearings 19, 19, and the sprocket 16 is secured to said sleeve 20 by means of one or more set screws 21, or any other suitable fastening means. Within the opposite ends of the sleeve 20 are mounted anti-friction bearings 22, 22, self-lubricating bronze bushings being illustrated. Journalled in the bearings 22 is a shaft 23, the sprocket 17 being secured to a projecting portion of said shaft by means of one or more set screws 24, or other suitable fastening means. A cotter pin 23' is shown at the opposite end of the shaft 23.

A V-pulley 25 is secured, by means of one or more set screws 26 or equivalent fastening means, to a portion of the sleeve 20 projecting from the barrel 18; and a similar V-pulley 27 is secured, by one or more set screws 28 or equivalent fastening means, to that portion of the shaft 23 between the adjacent end of the sleeve 20 and the sprocket 17. It will be clear that power received by the pulley 25 will be transmitted to the righthand ground wheel 12, while power received by the pulley 27 will be transmitted to the lefthand ground wheel (not shown).

A prime mover 29, which will ordinarily be a small gasoline engine, is mounted upon a suitable platform 30 carried by the frame 10, and drives pulley means 31 fixed to its output shaft 32. Preferably, the pulley means 31 will be a double grooved V-pulley, but obviously it may be made up of separate pulleys. A belt 33 runs over one portion of the pulley means 31 and over the pulley 25, while a belt 34 runs over another portion of the pulley means 31 and over the pulley 27. The belts 33 and 34 are normally so loosely associated with their respective pulley means that no power will be transmitted from the driving pulley means 31 to the driven pulleys 25 and 27, a suitable belt guard (not shown) being provided, in accordance with standard practice, to contour the belts properly when in slack condition.

A journal element 35 is suitably mounted upon a transverse axis in brackets 36 carried by the frame 10. A rock arm 37 is mounted to oscillate about the axis of the journal element 35. In the illustrated embodiment of the invention, the journal element 35 is rockable in the bearings provided by the ears 36, and the rock arm 37 is fixed, as by welding, to a sleeve 40, which is removably secured on said ground element or shaft 35. Said rock arm is formed to provide a finger 38 which projects substantially radially in one direction from the axis of the element 35, and a finger 39 which projects substantially radially in another direction from said axis, the two fingers 38 and 39 being peripherally spaced from each other and, in the illustrated embodiment of the invention, substantially diametrically opposite each other.

Fixed to the rock shaft 35, in an outboard position beyond the adjacent ear 36, is an arm 41 which, at its outer end, carries an idler pulley 42 registering with the belt 34 and swingable, about the axis of the shaft 35, in the plane of the belt toward and away from the line joining the axes of the driving shaft 32 and the jack shaft 23. It will be clear that, so long as the parts are in their illustrated positions, no power will be transmitted to the pulley 27; but that, when the arm 41 is rocked in a clockwise direction to move the pulley 42 toward said line, the effective length of the belt 34 will be reduced, to tighten said belt about its associated pulleys, whereby the rotation of the driving pulley 31 will be transmitted to the driven pulley 27, and thence to the lefthand sprocket 13.

A sleeve 43, similar to the sleeve 40, is journalled on the element 35 for independent oscillation relative thereto about the axis of the element 35. Fixed to said sleeve 43, as by welding, is a second rock arm 44 having fingers 45 and 46 projecting from the axis of said element 35 in a manner corresponding to the projection of the fingers 38 and 39. An arm 47 is fixed to the sleeve 43 to oscillate with the rock arm 44, said arm 47 carrying an idler pulley 48 which cooperates with the belt 33 in precisely the manner in which the pulley 42 cooperates with the belt 34. When the arm 47 is swung in a clockwise direction from its illustrated position, power will be transmitted from the driving pulley 31, through the belt 33, to the driven pulley 25 and thence to the righthand sprocket 13.

A member 49, proportioned and designed to span the free ends of the fingers 38 and 45, fixedly carries a pin 50 which loosely penetrates an opening in the end of the finger 38, and upon which is sleeved a coiled spring 51 confined between that face of the finger 38 remote from the member 49 and a nut 52 threadedly adjustably mounted upon the free end of the pin 50. The member 49 further carries fixedly a pin 53 penetrating the free end of the finger 45 and having sleeved thereon a coiled spring 54 confined between the remote face of the finger 45 and a nut 55 threadedly adjustably mounted upon the pin 53. As is shown at 56, the pins 50 and 53 loosely penetrate the cooperating openings in the fingers 38 and 45, respectively, and said openings may preferably be elongated in the direction of length of said fingers. A master control rod 57 has one end adjustably threadedly engaged with the member 49 and, in the embodiment illustrated in Fig. 1, has its other end pivotally associated with an ear 58 carried upon a lever 59. The lever 59 is pivotally mounted at 60 upon the cross brace 61 extending between the standard handle bars 62 and 63 of the frame 10. The arrangement is such that, as the lever 59 is swung in a counter-clockwise direction, looking down upon the frame, the ear 58 will carry the associated end of the rod 57 past the pivotal point 60, and the lever 59 will come into arresting contact with the brace 61.

It will be clear that, as the ear 58 so moves, the rod 57 will be drawn toward the rear end of the machine, thereby tending to pull the pins 50 and 53 rearwardly through the openings in the fingers 38 and 45, and thereby compressing the springs 51 and 54, to apply a force, concurrently, to the rock arms 37 and 44, tending to swing said arms in a clockwise direction. The initial degree of compression of the springs 51 and 54 may be individually adjusted by manipulation of the nuts 52 and 55, respectively, to compensate for slight variations in the lengths of the respective belts 34 and 33; and the rod 57 may be adjusted relative to the member 49 to vary the effect on said member 49 of the two limiting positions of the lever 59. Movement of the rock arms 37 and 44 in response to such forces will swing the arms 41 and 47 in a clockwise direction to press the idler pulleys 42 and 48 concurrently but resiliently into cooperative engagement with the belts 34 and 33 to tighten said belts to transmit power to the jack shaft assembly, and thence to the ground wheels. The toggle action of the lever 59 upon the rod 57 is such that, once it has been swung into engagement with the brace 61, it will remain in that position until intentionally returned to the illustrated position.

We may substitute for the toggle lever 59 a modified actuator and latch as shown in Fig. 4. In this form of the invention, the rod 57 passes loosely through an opening 76 in the brace 61 and carries a handle 77 secured to its outer end as by a pin 78. The rod 57 is formed with a notch 79 presenting a latch face 80 which, when the rod 57 has been drawn rearwardly to press the pulleys 42 and 48 into activating engagement with their associated belts 34 and 33, drops into retaining engagement with the brace 61 where it will remain until the rear end of the rod 57 is manually lifted. Preferably, a return spring 81 will be confined between the brace 61 and a suitable abutment means 82 fixedly associated with the rod 57.

It is desirable to provide means whereby the power of the engine 29 may be utilized to change the direction of movement of the machine; and one way to accomplish that function is to render temporarily ineffective the driving connection between the engine and one wheel 12 or the other. In order to take advantage of natural tendencies of operators, it is desirable to provide, adjacent each handle bar, means to be squeezed by the hand engaging that handle bar to render ineffective the driving connection to the wheel on the same side of the machine. The squeezing action tends to produce, also, a hold-back action upon the handle bar, which assists in the turning movement resultant upon discontinuation of the driving force to the wheel on the inside of the turn.

An actuator rod 64 passes loosely through an opening 65 in the free end of the finger 39 of the rock arm 37 and, on its end which projects beyond said finger, carries a suitable abutment (not shown). A similar actuator rod 66 similarly passes loosely through an opening 67 in the free end of the finger 46. The openings 65 and 67 may, if desired, be elongated in the direction of length of the fingers 39 and 46. In the illustrated embodiment of the invention, each actuator rod is threaded, through a substantial axial extent in the region penetrating its rock arm finger, and the abutment means carried by such actuator is shown as a nut 69, axially adjustably mounted upon the threaded portion 68 thereof. As is clear to be seen, the abutment on each actuator rod engages that face of its associated finger which leads, as its associated rock arm moves under the influence of force applied to such arm, through its associated spring. Alternatively, each actuator rod may be provided with a hook engaged in the opening 65 or 67 in its associated rock arm finger, in which case suitable-length-adjusting means will be associated with the upper, or rear, ends of said rods.

As shown, the actuator 64 extends rearwardly to a pivotal connection with a lever 70 pivoted at 71 upon the handle bar 63 and having an arm 72 which lies beneath said handle bar, inclines rearwardly away therefrom, and is swingable in a substantially vertical plane including said handle bar. Thus, as the lever arm 72 is squeezed toward the handle bar 63, the actuator 64 is moved rearwardly, and the engagement of its abutment 69 with the remote face of the finger 39 will swing the finger 39 in a counter-clockwise direction against the tendency of the spring 51, thereby swinging the arm 41 in a counter-clockwise direction to move the pulley 42 away from the line joining the axes of the shafts 32 and 23, and relaxing the belt 34 to render ineffective the drive connection between the engine 29 and the lefthand ground wheel.

Similarly, the actuator 66 extends rearwardly and is pivotally connected to a lever 73 mounted at 74 on the handle bar 62 and having an arm 75 which is related to the handle bar 62 in the manner in which the lever arm 72 is related to the handle bar 63. When the lever arm 75 is squeezed toward the handle bar 62, the actuator 66 is drawn rearwardly to swing the rock arm 44 in a counter-clockwise direction, thereby moving the pulley 48 away from the line joining the centers of the shafts 32 and 23 and relaxing the belt 33 to render ineffective the driving connection between the engine 29 and the righthand ground wheel.

It will be clear that either lever 72 or 75 may be actuated to shift its associated rock arm 37 or 44 against the tendency of the spring associated with such rock arm, without affecting the other rock arm or the member 49, it being remembered that the member 49 is not fixed to the fingers 38 or 45. On the other hand, a return of the lever 59 from engagement with the brace 61 to the position illustrated in Fig. 1, or release of the latch face 80 from the brace 61 in the form shown in Fig. 4, positively shifts both rock arms 37 and 44 in a counter-clockwise direction, through engagement of the member 49 with the trailing faces of the fingers 38 and 45, to move the pulleys 42 and 48 concurrently away from the line joining the centers of the shafts 32 and 23 to render ineffective the driving connections to both ground wheels. Obviously, with the parts in the positions illustrated in Fig. 1, actuation of the lever arms 72 and 75 will perform no useful function, even though it may swing pulley 42 or 48 farther away from the line joining the axes of the shafts 32 and 23.

In order that the parts may be adjusted to the accommodation of the hands of individual operators, the abutments 69 may be shifted axially along the actuators 64 and 66, thereby varying the relaxed positions and the effective positions of the lever arms 72 and 75.

We claim as our invention:

1. In a device of the class described, a frame, axle means supporting said frame, two ground wheels supporting said axle means and independently rotatable about the axis thereof, a prime mover supported on said frame, means providing a driving connection from said prime mover to each of said wheels independently, and means interposed in each such driving connection and operative to render its associated driving connection ineffective, said last-named means comprising an oscillable element for each driving connection, a spring associated with each oscillable element, a member operatively associated with both springs and shiftable to exert, through said springs, a force upon said oscillable elements tending to shift the same in a direction to render said driving connections effective, and other means operatively associated with each of said oscillable elements, each such other means being operative to shift its associated oscillable element against the tendency of its associated spring in a direction to render its driving connection ineffective, without affecting the other oscillable element or said member.

2. In a device of the class described, a frame, axle means supporting said frame, two ground wheels supporting said axle means and independently rotatable about the axis thereof, a prime mover supported on said frame, means providing a driving connection from said prime mover to each of said wheels independently, each such driving connection comprising a driving pulley and a driven pulley and a belt running over said pulleys, an idler pulley for each belt, and means independently supporting said idler pulleys for oscillation about external axes, a lever for each idler pulley, said levers being respectively connected to shift said pulleys relative to their respective belts to tighten and loosen said belts on said driving and driven pulleys, a spring for each lever, a member operatively associated with both said springs and movable to exert, through said springs, a force on both said levers tending to swing the same in a direction to shift said idler pulleys to tighten said belts, and another element operatively associated with each of said levers, each of said other elements being operable independently to swings its associated lever against the tendency of its associated spring, to shift its associated idler pulley in a direction to loosen its belt, without affecting the other of said levers or said member.

3. In a device of the class described, a pair of independently rotatable ground wheels, a frame supported on said wheels and including a pair of handle bars, a prime mover supported on said frame, means providing independent drive connections between said prime mover and said wheels, respectively, each such drive connection including a drive pulley, a driven pulley, a belt running over said drive and driven pulleys, and an idler pulley engageable with one reach of such belt to change the effective length thereof, a rock arm for each idler pulley, a spring for each of said rock arms, a member operatively connected with both of said springs, means connected with said member and extending into proximity with said handle bars, said last-named means being operable to exert, through said springs, a force tending to move said rock arms in a direction to reduce the effective lengths of said belts, a lever mounted on each handle bar, and a link connecting each handle bar lever with one rock arm only, each handle bar lever being operable to shift its associated rock arm, against the tendency of its associated spring, to increase the effective length of its associated belt without affecting the other rock arm or said member.

4. In a device of the class described, a pair of independently rotatable ground wheels, a frame supported on said wheels and including a pair of handle bars, a prime mover supported on said frame, means providing independent drive connections between said prime mover and said wheels, respectively, each such drive connection including a drive pulley, a driven pulley, a belt running over said drive and driven pulleys, and an idler pulley engageable with one reach of such belt to change the effective length thereof, a rock arm for each idler pulley, a lever pivotally carried on said frame adjacent said handle bars, a spring for each of said rock arms, a member operatively connected with both of said springs, means connecting said lever with said member and operative, when said lever is swung in one direction, to exert, through said springs, a force tending to move said rock arms in a direction to reduce the effective lengths of said belts, a lever mounted on each handle bar, and a link connecting each handle bar lever with one rock arm only, each handle bar lever being operable to shift its associated rock arm, against the tendency of its associated spring, to increase the effective length of its associated belt without affecting the other rock arm of said member.

5. The device of claim 4 in which said means connecting said member with said lever is so connected with said lever that it moves through a dead-center position as said lever swings to exert such force.

6. The device of claim 3 in which actuation of either handle bar lever increases the effective length of that belt included in the drive train for the ground wheel on the same side of the frame with the actuated handle bar lever.

7. The device of claim 3 in which each handle bar lever includes an arm having its forward end pivotally associated with its handle bar and inclining rearwardly and downwardly in a plane including its handle bar, and in which the effective length of the link connecting each handle bar lever with a rock arm is adjustable to vary the angular relation between such handle bar lever and its associated handle bar.

8. In a device of the class described, a pair of independently rotatable ground wheels, a frame supported on said wheels and including a pair of handle bars, a prime mover supported on said frame, means providing independent drive connections between said prime mover and said wheels, respectively, each such drive connection including a drive pulley, a driven pulley, a belt running over said drive and driven pulleys, and an idler pulley engageable with a reach of such belt to change the effective length thereof, a rock arm for such idler pulley, a spring for each of said rock arms, a member operatively connected with both of said springs, a rod connected with said member and extending into proximity with said handle bars, said rod being actuable to exert, through said springs, a force tending to move said rock arms in a direction to reduce the effective lengths of said belts, said rod and an element of said frame being provided with means cooperable to hold such rod in position to maintain such force, a lever mounted on each handle bar, and a link connecting each handle bar lever with one rock arm only, each handle bar lever being operable to shift its associated rock arm, against the tendency of its associated spring, to increase the effective length of its associated belt without affecting the other rock arm or said member.

9. In a device of the class described, a drive shaft, two coaxial driven shafts, independent means for providing a driving connection between said drive shaft and each of said driven shafts, a journal element, two rock arms supported on said journal element for independent oscillation about the axis thereof, means associated with each of said driving connections, each of said last-named means being movable between a position rendering its associated driving connection effective and a position rendering its associated driving connection ineffective, each of said last-named means being movable with one of said rock arms, a spring for each rock arm, a member operative to exert, through said springs, a force tending to move said rock arms in a direction to shift both said last-named means to positions rendering their associated driving connections effective, and two actuators, each of said actuators being cooperable with one only of said rock arms to shift the same, against the tendency of its associated spring, into a position rendering its associated driving connection ineffective.

10. In a device of the class described, a drive shaft, two coaxial driven shafts, a driven pulley on each of said driven shafts, drive pulley means on said drive shaft, a belt for each driven pulley loosely associated with said drive pulley means, an idler pulley for each belt mounted for registry with its associated belt and movable, in the plane of its associated belt, toward and away from a line joining the centers of said drive shaft and driven shafts to render its associated belt effective or ineffective to drive its associated driven pulley, a journal element, two rock arms supported on said journal element for independent oscillation about the axis of said journal element, each rock arm being operatively connected to one of said idler pulleys to shift the same, single means operatively associated with both of said rock arms to move the same concurrently to shift said idler pulleys in either direction, independent means operatively associated with one of said rock arms to move its associated idler pulley away from said line, and other independent means operatively associated with the other of said rock arms to move its associated idler pulley away from said line.

11. In a device of the class described, a drive shaft, two coaxial driven shafts, a driven pulley on each of said driven shafts, drive pulley means on said drive shaft, a belt for each driven pulley loosely associated with said drive pulley means, an idler pulley for each belt mounted for registry with its associated belt and movable, in the plane of its associated belt, toward and away from a line joining the centers of said drive shaft and driven shafts to render its associated belt effective or ineffective to drive its associated driven pulley, a journal element, two rock arms supported on said journal element for independent oscillation about the axis of said journal element, each rock arm being operatively connected to one of said idler pulleys to shift the same, spring means associated with said rock arms, single means operatively associated with said spring means to exert, through said spring means, a force tending to move said rock arms concurrently to shift said idler pulleys in either direction, independent means operatively associated with one of said rock arms to move its associated idler pulley against the tendency of said spring means away from said line, and other independent means operatively associated with the other of said rock arms to move its associated idler pulley against the tendency of said spring means away from said line.

12. In a device of the class described, a drive shaft, two coaxial driven shafts, a driven pulley on each side of said driven shafts, drive pulley means on said drive shaft, a belt for each driven pulley loosely associated with said drive pulley means, an idler pulley for each belt mounted for registry with its associated belt and movable, in the plane of its associated belt, toward and away from a line joining the centers of said drive shaft and driven shafts to render its associated belt effective or ineffective to drive its associated driven pulley, a journal element, two rock arms supported on said journal element for independent oscillation about the axis of said journal element, each rock arm being operatively connected to one of said idler pulleys to shift the same, a spring for each of said rock arms, single means cooperatively engaging both said springs and operable to exert, through said springs, a force tending to move said rock arms concurrently to shift said idler pulleys toward said line, independent means operatively associated with one of said rock arms to overcome the force so exerted thereon by its associated spring, and other independent means operatively associated with the other of said rock arms to overcome the force so exerted thereon by its associated spring.

13. In a device of the class described, a drive shaft, two coaxial driven shafts, a driven pulley on each of said driven shafts, drive pulley means on said drive shaft, a belt for each driven pulley loosely associated with said drive pulley means, an idler pulley for each belt mounted for registry with its associated belt and movable, in the plane of its associated belt, toward and away from a line joining the centers of said drive shaft and driven shafts to render its associated belt effective or ineffective to drive its associated driven pulley, a journal element, two rock arms supported on said journal element for independent oscillation about the axis of said journal element, each rock arm being operatively connected to one of said idler pulleys to shift the same, a pin loosely penetrating each rock arm and providing an abutment spaced from one surface of its associated rock arm, a spring sleeved on each pin and confined between said abutment and said rock arm surface, a member fixed to both said pins and abutting the opposite surface of each of said rock arms, means operable to shift said member in either direction about the axis of said journal element, and an independent actuator for each of said rock arms, each actuator having a one-way connection with its associated rock arm and being operable to overcome forces exerted upon its associated rock arm by the spring associated with said arm, but ineffective to overcome forces exerted upon its associated rock arm by said member.

14. The device of claim 13 in which each rock arm has a first finger projecting from the axis of said journal element and a second finger projecting from said axis and peripherally spaced from said first finger, in which the pin associated with each rock arm penetrates the first finger thereof and the associated spring and the member engage said first finger thereof, and in which each actuator loosely penetrates the second finger of its associated rock arm and is provided with an abutment cooperating with that face of such finger which leads as the rock arm moves under the influence of force applied thereto through its associated spring.

15. The device of claim 14 including an actuating lever for each actuator, each actuating lever being mounted for oscillation about a fixed pivot and being operatively connected to its associated actuator, and in which each actuator is a rod having a threaded portion of substantial axial extent in the region in which it penetrates its associated finger, and in which the abutment on each actuator is a nut axially adjustably mounted on such threaded portion.

ROBERT D. EAGLESFIELD.
AUSTIN E. CURTISS.
CHARLES W. MEGGENHOFEN.

REFERENCES CITED

The following references are of record in the file of this patent:

UNITED STATES PATENTS

| Number    | Name            | Date          |
|-----------|-----------------|---------------|
| 1,589,393 | Howe            | June 22, 1926 |
| 1,834,211 | Humphreys et al.| Dec. 1, 1931  |
| 2,015,587 | Bready          | Sept. 24, 1935|
| 2,461,391 | Osterhaus       | Feb. 8, 1949  |